United States Patent [19]
DuBose, Jr.

[11] Patent Number: 4,989,334
[45] Date of Patent: Feb. 5, 1991

[54] TILT INDICATOR

[76] Inventor: Thomas L. V. DuBose, Jr., 112 Riviera Dr., Hendersonville, Tenn. 37075

[21] Appl. No.: 331,904

[22] Filed: Mar. 30, 1989

[51] Int. Cl.⁵ .............................................. G01C 9/10
[52] U.S. Cl. ...................................... 33/365; 116/215
[58] Field of Search ......................... 33/365; 116/215

[56] References Cited

U.S. PATENT DOCUMENTS

| | | | |
|---|---|---|---|
| Re. 32,570 | 1/1988 | Conn | 116/215 |
| 2,674,221 | 4/1954 | Tinsley | 116/114 |
| 3,467,053 | 9/1969 | Davis et al. | 116/215 |
| 3,486,238 | 12/1969 | Hansen | 33/211 |
| 3,497,950 | 3/1970 | Squire et al. | 29/622 |
| 3,880,108 | 4/1975 | Anton | 116/215 |
| 3,923,000 | 12/1975 | Cloyd | 116/215 |
| 3,926,144 | 12/1975 | Lauder | 116/215 |
| 4,135,472 | 1/1979 | Chesla et al. | 116/215 |
| 4,267,641 | 5/1981 | Shinozaki et al. | 33/365 |
| 4,340,008 | 7/1982 | Mendelson | 116/215 |
| 4,438,720 | 3/1984 | Conn | 116/215 |

FOREIGN PATENT DOCUMENTS

| | | | |
|---|---|---|---|
| 3501744 | 7/1986 | Fed. Rep. of Germany | 33/365 |
| 0646197 | 2/1979 | U.S.S.R. | 33/365 |
| 188696 | 4/1922 | United Kingdom | 33/365 |

*Primary Examiner*—Thomas B. Will
*Attorney, Agent, or Firm*—Christensen, O'Connor, Johnson & Kindness

[57] ABSTRACT

A tilt indicator includes a plurality of compartments with one or more compartments having an indicator inside. An exit from each compartment permits one or more indicators to leave. As the degree of tilt increases, the absence of an indicator in one or more compartments will indicate the degree of tilt.

14 Claims, 3 Drawing Sheets

TILT INDICATOR

BACKGROUND OF THE INVENTION

This invention relates generally to devices for indicating that goods packed in containers or otherwise have been tilted during transportation. More specifically it relates to improvements in such devices.

Devices for indicating that goods that are being transported whether for movement in a plant or other facility or for shipment from one geographical location to another are of course known in the art. However, those with which the applicant herein is familiar are all designed to provide an indication when a single amount of tilt (degrees from the vertical) has occurred. However, different goods may tolerate different angles of tilt and an assortment of indicators may be necessary. For instance different indicators for 20, 30, 50 or 60 permissible degrees of tilt may have to be made available in order to accommodate a variety of needs. As can be appreciated if excessive tilt is indicated then of course the goods have been improperly handled by the transporter and possibly have been damaged.

Therefore it is an object of this invention to provide a novel tilt indicator capable of indicating not only that goods in transport have been tilted but also the degree or amount of tilt so that a single indicator can be used on a variety of goods each having different permissible angles of tilt.

It is another object of this invention to provide a novel tilt indicator which can be constructed in a variety of ways to provide an indication of the degree or amount of tilt of a package containing goods in transport.

A still further object of this invention is to provide a novel tilt indicator which can be made using relatively inexpensive materials so as to be disposable after use.

Yet another object of this invention is to provide a novel tilt indicator that can easily be attached to goods in transport or to packages containing such goods.

BRIEF SUMMARY OF THE INVENTION

The foregoing and other objects are achieved by a container provided with a plurality of compartments either holding indicating means or capable of receiving such means. In one form when the container is tilted the indicating means can exit from one or more compartments as the container is tilted so that an empty compartment will indicate whether the container has been tilted beyond an opening to that compartment. In another form an indicating means in one compartment may fall to successive compartments as the container is tilted to a greater degree.

BRIEF DESCRIPTION OF THE DRAWINGS

The invention itself is set forth in claims appended hereto and forming a part of this specification while an understanding of various embodiments thereof may be had by reference to detailed description taken in conjunction with the drawings in which:

DETAILED DESCRIPTION

Figure 1:
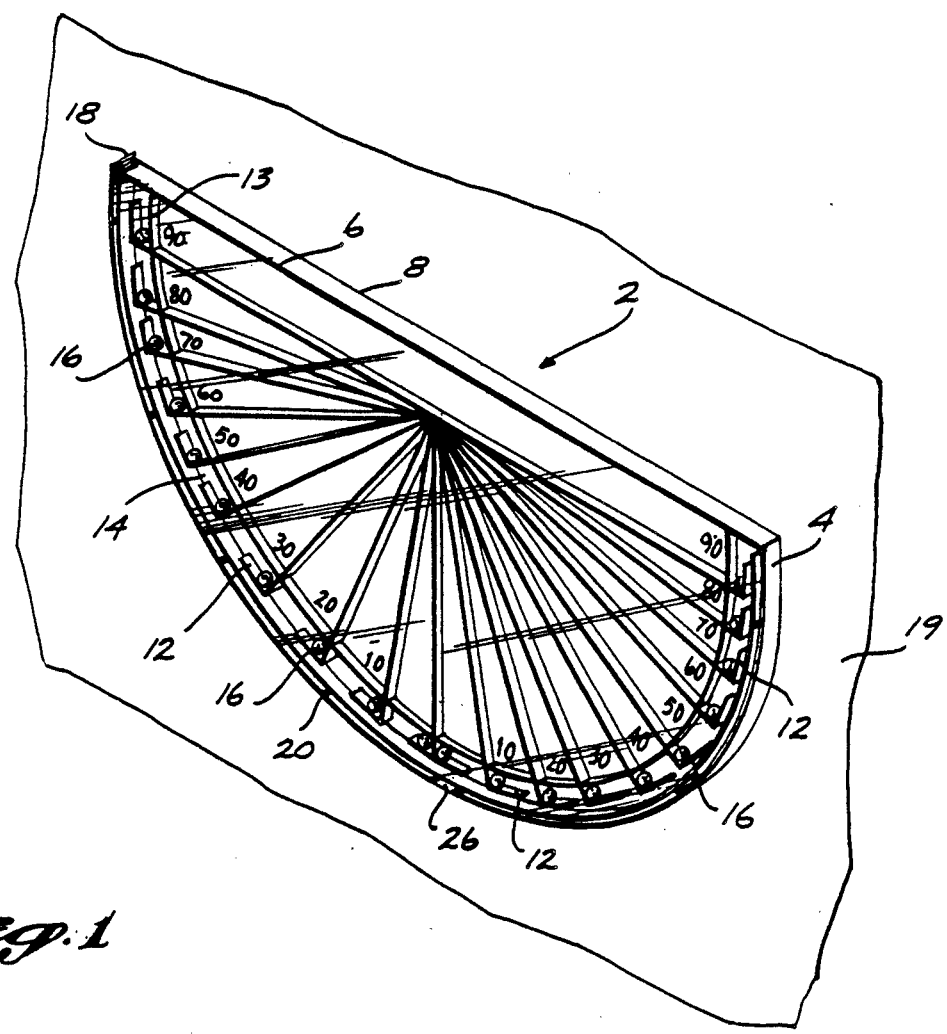
FIG. 1 is an isometric view of a first embodiment of the invention.
Figure 2:
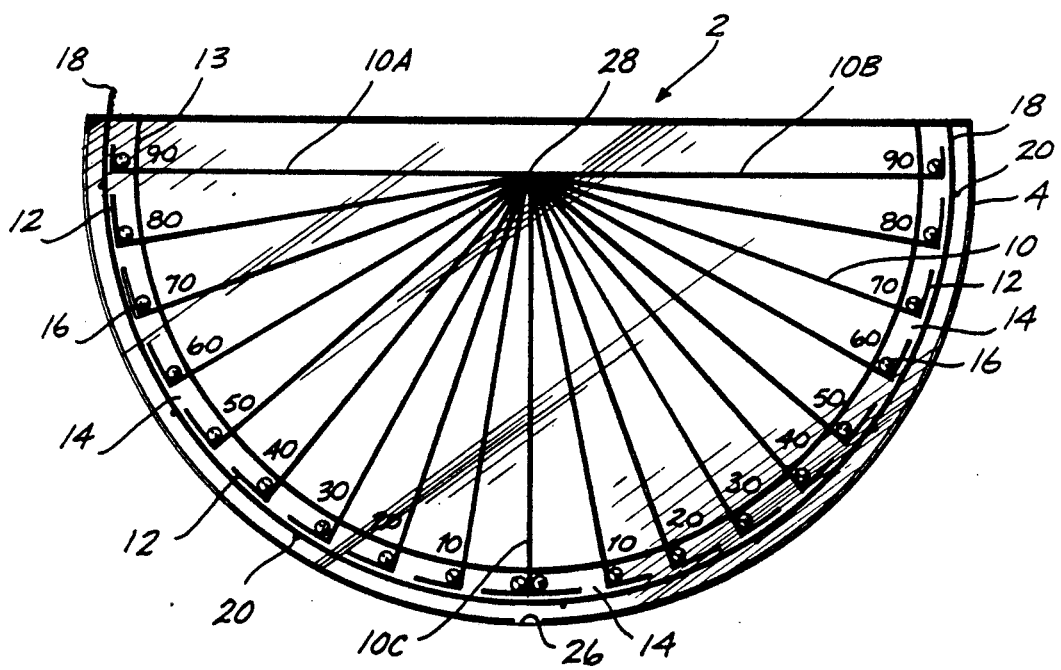
FIG. 2 is a side view of the embodiment of FIG. 1.
Figure 3:
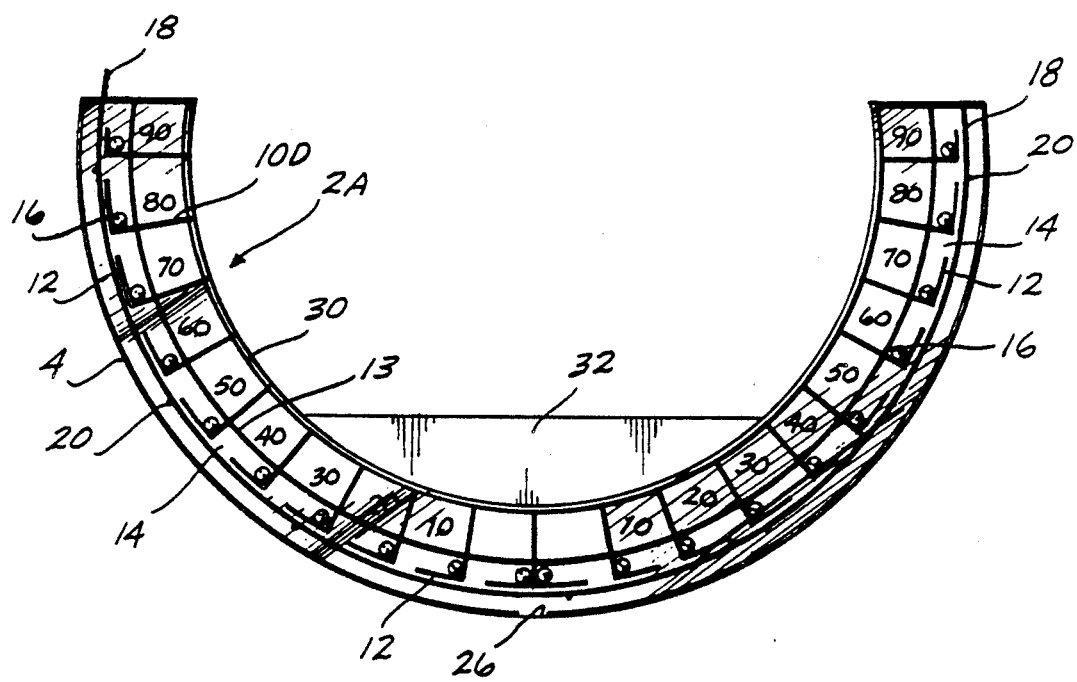
FIG. 3 is a front view of a second embodiment of the invention.

With particular reference to FIGS. 1 through 3 a first embodiment of the invention comprises a container shown generally at 2. The container includes an outer side wall 4, a front wall 6 and a back wall 8. Formed between the front and back walls are plurality of radially extending dividers 10 extending from the center of the container toward its periphery. At the end of each divider 10 is a circumferentially extending tab 12. The tabs 12 extend between the front and back walls and toward an adjacent divider. As may be seen each tab 12 terminates short of an adjacent divider so as to leave openings 14. The construction shown and described provide a plurality of compartments. Each compartment is formed by an inner wall 13, a tab 12 and a portion of a divider 10 on either side of a compartment and has an opening 14.

An indicating means means in this case a ball bearing 16, is provided in each compartment. A locking strip 18 extends around the circumference of the container and between the front and back walls 6 and 8 to close off the openings 14 until use of the device is desired. A plurality of pins 20 extending between the front and back walls serve to hold the locking strip 18 in position against the tabs 12 and close off the openings 14.

When it is desired to use an indicator in accordance with the invention it may be attached to any suitable surface as for instance the wall 19 of a package or any article intended to remain vertical. One way in which this could be done is to provide an adhesive coating on the back wall 8 covered with a protective sheet to be peeled away exposing the adhesive for attachment purposes when the device is attached or just before the locking strip 18 is pulled out of the container exposing the openings 14. When the article to which the indicator is attached is tilted one or more ball bearings depending upon the degree of tilt will roll out of its compartment through an opening 14 into the space between the tabs 12 and the outer wall 4 and exit through an opening 26 in the outer side wall 2.

The embodiment of FIG. 1 is formed to be partially circular or disc-like in shape. A pair of dividers 10A and 10B extends from a center 28 along what would be the diameter of a circle. Another divider 10C extends from the center 28 and when the indicator is mounted on a package or goods indicates a zero degree tilt line. The other dividers 10 radiate from 28 at increasingly larger angles and in the case of the illustrated embodiment they are 10° apart going up to 90°. Thus if there is a slight tilt of say 10° to the right, as shown in the drawing the ball bearing in the compartment formed in part by the 10° divider will exit through its opening to provide the desired indication. Obviously the number of dividers and compartments, as well as their spacing may be varied by a designer as different applications arise.

The indicator may be of plastic or lightweight metal so as to be economically manufactured and thus disposable after use. The front wall should be transparent or at least that part covering the compartments should be so that by visual inspection it can be determined which, if any, compartments have no ball bearings in them so that what degree of tilt, if any, has occurred.

Indicating means other than ball bearings could be used. For instance a granular material or a relatively viscous liquid could also serve that purpose.

FIG. 3 illustrates another embodiment of the invention. In this figure those parts which correspond to those in the embodiment of FIG. 1 have been given the same reference numeral. This embodiment rather than being formed as a partial disc is formed a portion of band or a hoop 2A. Thus in addition to outer side wall 4 and the inner side wall 12 it includes a rear side 30 and the dividers 10D radiate from an imaginary point corresponding to the center 28 in FIG. 1. Otherwise the structure is the same and a surface 32 may be provided for strength purposes and to permit the printing of instructions or advertising. As before the area in front of the compartments should be transparent.

Figure 4:
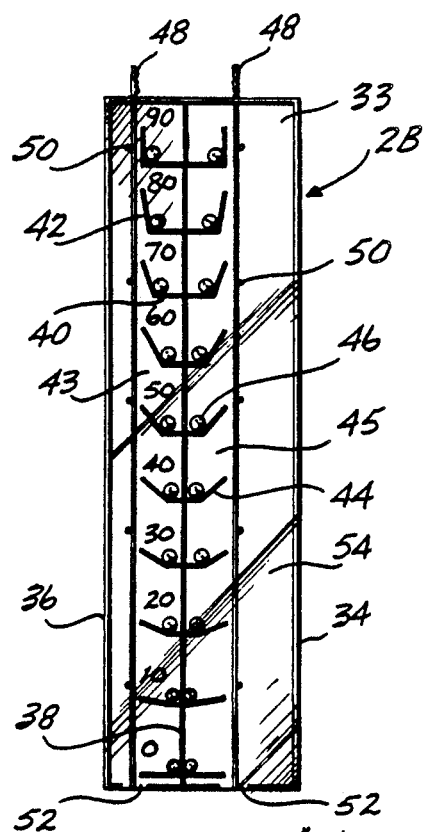
FIG. 4 is a view of the front of a third embodiment of the invention.

The embodiment of FIG. 4 rather than being formed with a circular or arcuate shape is formed with a rectangular configuration. Here the container 2B is relatively long and narrow has a front wall 33 and side walls 34 and 36. The back wall is not shown but the indicator is of a sufficient thickness to accommodate the compartments and indicating means as will be described. A divider 38 extends from the top to the bottom and from front to back. Spaced along the divider are a plurality of supports or shelves 40 each normally extending slightly upwardly from the divider. As illustrated their ends bend upwardly a slight angle. The supports 40 together with the divider 38 form compartments in which the indicator means, in this case ball bearings 42, are placed until they roll out of the compartment openings 43 when and if the indicator is tilted while in use. This embodiment, as may the other, may be constructed to indicate tilt in one direction or in two. To this end supports 44, openings 45 and indicating means 46 are provided on the other side of the divider 38.

In order to hold the indicating means in their compartments until use, locking strips 48 are provided, and held in position by posts 50 until removed through the vents or openings 52 at the bottom of the indicator.

As before the number of compartments and their spacing may be varied as required by a designer for different applications. Likewise space 54 may be provided printing, advertising or instructional material while the surface over the compartments is left transparent.

As with the earlier described embodiments adhesive on the back of each container may be used to attach the tilt indicators of FIGS. 3 and 4 to a package or other article.

Figure 5:
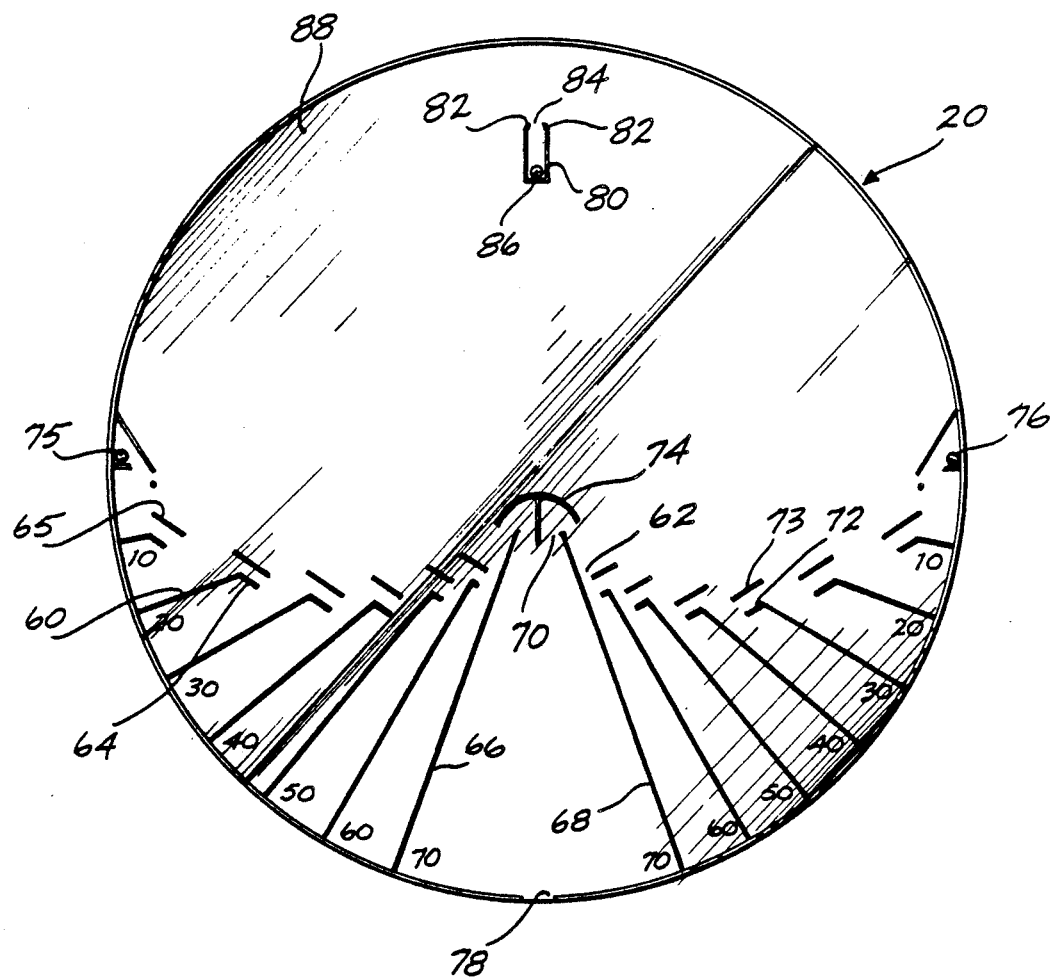
FIG. 5 is a view of the front of a fourth embodiment of the invention.

FIG. 5 illustrates still another embodiment of the ivention. This version uses only three indicator means or ball bearings and has its compartments at the periphery of the container. The container 2C is formed in a circular configuration and has a plurality of dividers 60 and 62. The dividers 60 extend from the periphery of the container on the left hand side and each is progressively longer than the one immediately preceding it starting from the upper left hand side and continuing toward the bottom as shown in the drawing. Thus the divider for 10° is shorter than that for 20° and so on. Each divider 60 is provided with a lip 64 bent downwardly slightly toward its adjacent divider. Spaced from each lip 64 are inclined guides 65 to ensure that as an indicating means leaves a divider 60 it will pass the next divider to be held there unless the indicator it tilted further. The divider 66, indicating 70° of tilt extends the furthest toward the center of the container and its free end is spaced from a corresponding divider 68 on the right hand side so as to provide an opening 70.

The dividers 62 on the right side of the container are formed similarly to those on the left hand with tabs 72 and as may be seen the dividers 62 with their tabs 72 extend in a direction opposite to that of the dividers 60 and tabs 64. Guides 73 are spaced from the tabs 72 for the same purpose as the guides 65.

An arcuate guide 74 is spaced from the opening 70 to insure that the indicating means, in this case either the ball bearing 75 or the ball bearing 76, will pass through the opening 70 and an opening 78 in the event its indicator is tilted 70° or more.

Provided at the top of the container is generally U-shaped compartment 80 having tabs 82 extending toward each other but spaced at their ends to leave an opening 84. A ball bearing tilt indicating means 86 is held in this compartment. Adhesive 88 is provided on one surface of the container to permit attachment of the container to an article as a package.

In this embodiment of the invention, if it is assumed that the container is tilted to the right the ball bearing 75 will leave the divider 60 extending along a normally horizontal line indicating 0° of tilt and restrained by a guide 65 to fall to next divider to indicate 10° of tilt and further to other dividers if the indicator is tilted further. If the tilt is in excess of 70° the ball bearing will pass through the openings 70 and 78 to exit from the container. The ball bearing 76 on the right hand will function in the same way if the tilt is to the right. If the indicator is more than 70° the ball bearing 86 in the compartment 80 will exit through the opening 84 to indicate that event.

Obviously modifications and variations may be made in the design of a tilt indicator in accordance with the invention and it is intended by the claims appended hereto to cover all such modifications as come within their scope.

The embodiments of the invention in which an exclusive property or privilege is claimed are defined as follows:

1. A tilt indicator comprising:
   (a) a container having an arcuate shape;
   (b) a plurality of compartments formed in said container and arranged in a semicircular pattern adjacent the periphery of said container, each spaced from an adjoining compartment a fixed number of degrees;
   (c) indicating means normally positioned within at least some of said compartments;
   (d) each compartment having an opening whereby when said container is tilted from a normal orientation said indicator means will exit from one or more compartments through one of said openings to provide an indication of the amount of tilt;
   (e) dividers within said container and forming, in part, said compartments and wherein a first divider extends at a right angle between the center of said container and the periphery of said container to designate zero degrees of tilt; and
   (f) a removable locking strip extending over each opening to prevent exiting of said indicating means until the tilt indicator is put into use.

2. A tilt indicator as set forth in claim 1, wherein said container has a rear wall, a front wall and outer side wall and wherein other dividers extend between the center of the container and the periphery of said container on either side of said first divider and radiate outwardly therefrom a fixed number of degrees apart.

3. A tilt indicator as set forth in claim 2 including:

(a) an inner side wall spaced from said outer side wall extending between said front and rear walls intersecting said dividers; and (b) a tab on each divider extending toward an adjacent divider and terminating short of said adjacent divider to constitute a compartment and provide said opening therein.

4. A tilt indicator as set forth in claim 3 wherein said locking strip normally extends between said tabs and said outer wall over said compartment openings and has a portion extending from said container whereby it may be pulled from said container to expose said compartment openings.

5. A tilt indicator as set forth in claim 4 wherein said indicating means are constituted by ball bearings each capable of successively rolling from its compartment opening as said container is tilted from the vertical by increased amounts of tilt.

6. A tilt indicator as set forth in claim 5 wherein said outer wall has an opening provided therein whereby a ball bearing after rolling through its compartment opening may exit from said container.

7. A tilt indicator comprising:
(a) a container having an arcuate shape;
(b) a plurality of compartments formed in said container and arranged in a semicircular pattern adjacent the periphery of said container, each spaced from an adjoining compartment a fixed number of degrees;
(c) indicating means normally positioned within at least some of said compartments;
(d) each compartment having an opening whereby when said container is tilted from a normal orientation said indicator means will exit from one or more compartments through one of said openings to provide an indication of the amount of tilt;
(e) said container having a rear wall, a front wall, an outer side wall and an inner side wall and a plurality of dividers extending between said inner side wall and said outer side wall to, in part, form said compartments;
(f) a tab extending from each divider toward an adjacent divider to provide the openings from each compartment;
(g) wherein said dividers are arranged in a semicircular pattern; and
(h) a removable locking strip extending over each opening to prevent exiting of said indicating means until the tilt indicator is put into use.

8. A tilt indicator as set forth in claim 7 wherein said locking strip normally extends between said tabs and said outer wall over said compartment openings and has a portion extending from said container whereby it may be pulled from said container to expose said compartment openings.

9. A tilt indicator as set forth in claim 8 wherein said indicating means are constituted by ball bearings each capable of successively rolling from its compartment opening as said container is tilted from the vertical by increased amounts of tilt.

10. A tilt indicator as set forth in claim 9 wherein said outer wall has an opening provided therein whereby a ball bearing after rolling through its compartment opening may exit from said container.

11. A tilt indicator comprising:
(a) a container having an arcuate shape;
(b) a plurality of compartments formed in said container and arranged in a semicircular pattern adjacent the periphery of said container, each spaced from an adjoining compartment a fixed number of degrees;
(c) indicating means normally positioned within at least some of said compartments;
(d) each compartment having an opening whereby when said container is tilted from a normal orientation said indicator means will exit from one or more compartments through one of said openings to provide an indication of the amount of tilt;
(e) a removable locking strip over each opening to prevent exiting of said indicating means until the tilt indicator is put into use;
(f) spaced dividers extending inwardly from the periphery of said container to form said compartments at the periphery of said container, and wherein said dividers incline at different angles with respect to each other and are of different lengths; and
(g) wherein one divider extends along a normally horizontal line in said container to indicate zero degrees of tilt and is shorter than the divider next to it and each succeeding divider is longer than the one preceding it.

12. A tilt indicator as set forth in claim 11 including guide means spaced slightly from the end of each divider.

13. A tilt indicator as set forth in claim 12 wherein said indicating means is constituted by a ball bearing normally disposed on said one divider when the indicator is in a vertical position.

14. A tilt indicator as set forth in claim 13 including a generally U-shaped compartment normally opening upward and indicator means therein.

* * * * *